United States Patent [19]

Lehner et al.

[11] Patent Number: 4,521,855

[45] Date of Patent: Jun. 4, 1985

[54] ELECTRONIC ON-ORBIT ROLL/YAW SATELLITE CONTROL

[75] Inventors: John A. Lehner, Sunnyvale; Kenneth L. Lebsock, Manhattan Beach, both of Calif.

[73] Assignee: Ford Aerospace & Communications Corporation, Detroit, Mich.

[21] Appl. No.: 288,230

[22] Filed: Jul. 27, 1981

[51] Int. Cl.³ .............................................. B64G 1/10
[52] U.S. Cl. ................................... 364/434; 364/459; 244/164
[58] Field of Search ............... 364/434, 459; 244/3.21, 244/3.22, 164–173; 318/582, 585, 586; 73/178 R

[56] References Cited

U.S. PATENT DOCUMENTS

| | | | |
|---|---|---|---|
| 3,350,033 | 10/1967 | Goldberg | 244/165 |
| 3,591,108 | 7/1971 | Perkel et al. | 244/3.21 |
| 3,866,025 | 2/1975 | Cavanagh | 364/459 |
| 3,998,409 | 12/1976 | Pistiner | 364/434 |
| 3,999,729 | 12/1976 | Muhlfelder et al. | 364/434 |
| 4,010,921 | 3/1977 | Pistiner et al. | 244/165 |
| 4,032,759 | 6/1977 | Danik | 73/178 R |
| 4,046,341 | 9/1977 | Quinlivan | 244/181 |
| 4,062,509 | 12/1977 | Muhlfelder et al. | 244/169 |
| 4,071,211 | 1/1978 | Muhlfelder et al. | 244/165 |
| 4,084,772 | 4/1978 | Muhlfelder | 244/165 |
| 4,106,094 | 8/1978 | Land | 364/434 |
| 4,188,666 | 2/1980 | Legrand et al. | 364/434 |
| 4,294,420 | 10/1981 | Broquet | 244/165 |
| 4,325,124 | 4/1982 | Renner | 364/434 |

OTHER PUBLICATIONS

Bryson and Luenberger, "The Synthesis of Regulator Logic Using State–Variable Concepts", Proceedings of the IEEE, vol. 58, No. 11, Nov. 1970 at 1803.
Spector and Iwens, "Attitude Control of a Communication Satellite During Stationkeeping Using a Yaw Estimator", published Aug. 11, 1980, at the Guidance and Control Conf. of the American Institute of Aeronautics and Astronautics, Danvers, Mass.
Terasaki, "Dual Reaction Wheel Control of Spacecraft Pointing", Air Force Report No. SAMSO-TR-68-18, Nov. 1967.
Lebsock, "High Pointing Accuracy with a Momentum Bias Attitude Control System", Paper 78-569 at the AIAA 7th Communications Satellite Systems Conference, San Diego, Calif., Apr. 24-27, 1978, submitted Jul. 11, 1978.
Bowers, Rodden, Scott, and DeBra, "Orbital Gyrocompassing Heading Reference", Journal of Spacecraft and Rockets, vol. 5, No. 8, Aug. 1968, pp. 903–910.

Primary Examiner—Gary Chin
Attorney, Agent, or Firm—Edward J. Radlo; Robert D. Sanborn

[57] ABSTRACT

Disclosed is a method and apparatus estimating yaw error and roll and yaw disturbance torques from measured roll error and yaw momentum on a continuous on-orbit basis in an orbiting satellite. The information thus obtained can be used to continuously correct for the yaw error by means of, for example, activating a magnetic torquer. Two control loops are used in this invention, a fast loop to damp nutations by changing momentum wheel speed, and a slow loop of the Luenberger observer variety. The latter is a yaw error correction loop which also serves to unload yaw momentum. The satellite in which the invention was first incorporated is of the type having three momentum wheels, all situated in the plane orthogonal to the roll axis. In normal operation, two wheels, each having major momentum component along the pitch axis and minor momentum component along the yaw axis, are operable. A third backup wheel aligned along the yaw axis becomes operable only in the eventuality that one of the primary wheels suffers a breakdown during the life of the satellite. The slow speed yaw loop is used to adjust a magnetic coil torquer. It can be implemented in a number of forms including a hard-wired analog form or a digital computer with certain constant scaling factors programmed into the memory of the computer.

11 Claims, 2 Drawing Figures

ON-ORBIT ROLL/YAW CONTROL LOOPS

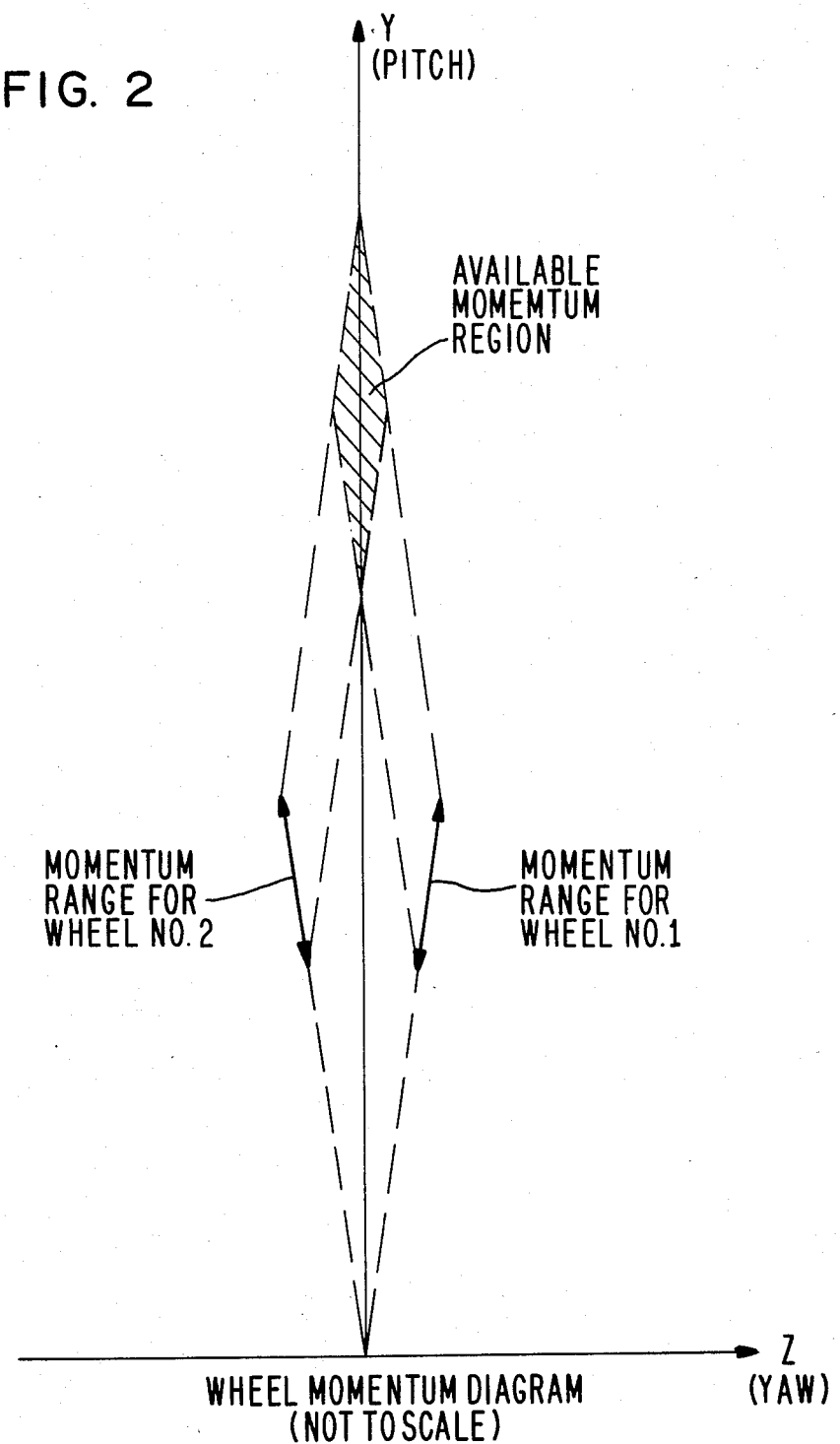

ELECTRONIC ON-ORBIT ROLL/YAW SATELLITE CONTROL

BACKGROUND OF THE INVENTION

1. Field of the Invention: This invention relates to satellite control systems and more particularly, to a system for the on-orbit correction of yaw error by automatic means using minimal hardware.

2. Description of the Prior Art: U.S. Pat. No. 3,866,025 uses on board computer 26 in conjunction with rate gyros in a satellite control system. The present invention uses electronic means in lieu of heavy, bulky gyros to estimate yaw angle from roll angle and yaw momentum.

U.S. Pat. No. 3,998,409 uses star sensors, sun sensors and gyroscopes to perform attitude control. These bulky items are not necessary in the present invention. The patent covers a zero momentum system unlike the momentum storage satellite that is described in the present specification.

U.S. Pat. No. 3,999,729 is a zero momentum system unlike the stored momentum system of the present specification.

U.S. Pat. Nos. 4,032,759 and 4,046,341 show a Kalman filter as a shipboard reference for an aircraft navigation system. The present invention uses a Luenberger observer, which is somewhat related to a Kalman filter, in a satellite on-orbit correction loop.

U.S. Pat. No. 4,071,211 utilizes sun sensors and knowledge of ephemeris to estimate yaw, unlike the present invention which does not require either.

U.S. Pat. No. 4,106,094 is a general description of estimators in inertial navigation systems.

Bryson and Luenberger, "The Synthesis of Regulator Logic Using State-Variable Concepts", *Proceedings of the IEEE*, Vol. 58, No. 11, November 1970 at 1803, provides a tutorial introduction to estimation theory and the type of filtering which became known as a Luenberger observer.

Spector and Iwens, "Attitude Control of a Comunication Satellite During Stationkeeping Using a Yaw Estimator", published Aug. 11, 1980, at the Guidance and Control Conference of the American Institute of Aeronautics and Astronautics, Danvers, Mass., subsequent to the completed conception of the present invention, is an application of Luenberger observers and Kalman filtering to a satellite during stationkeeping. The present invention, on the other hand, is an on-orbit attitude determination and control system. The paper's short term (on the order of 600 seconds) yaw correction loop is designed to counteract high disturbance torques caused by thruster firing, whereas the present invention's slow loop (on the order of an orbit period of 24 hours) counteracts low torques, such as those caused by solar pressure. The paper's detailed derivation addresses a system with momentum along the pitch axis only, due to a single pitch momentum wheel, whereas the present specification covers the embodiment of momentum along both the pitch and yaw axes.

Terasaki, "Dual Reaction Wheel Control of Spacecraft Pointing", Air Force Report No. SAMSO-TR-68-18, November 1967, discloses a control loop in a spacecraft having two momentum wheels. The control loop controls the speed of one of the wheels to damp nutation, and is relevant to the fast loop portion of the present invention.

Lebsock, "High Pointing Accuracy With a Momentum Bias Attitude Control System", Paper 78-569 at the AIAA 7th Communications Satellite Systems Conference, San Diego, Calif., Apr. 24-27, 1978, submitted July 11, 1978, revision received Nov. 5, 1979, provides an overview of the satellite attitude control system for which the present invention had its initial implementation. The paper does not disclose details of the yaw error correction system of the present invention.

Bowers, Rodden, Scott, and DeBra, "Orbital Gyrocompassing Heading Reference", *Journal of Spacecraft and Rockets*, Vol. 5, No. 8, August 1968, pp. 903–910, discloses a gyrocompassing technique for estimating yaw angle from roll angle. It differs from the present invention in that it does not disclose a stored momentum system. It uses bulky gyroscopes, which the present invention eliminates. Further, the present invention gets better accuracy.

Secondary references are U.S. Pat. Nos. 3,350,033; 3,591,108; 4,010,921; and 4,062,509.

SUMMARY OF THE INVENTION

In an orbiting satellite, three orthogonal axes are defined conventionally. The three axes define the desired orientation of the spacecraft at any point in its orbit. The reference yaw axis (also designated the Z axis) connects the spacecraft center of mass with the center of mass of the body (which in the embodiment described herein is the earth) around which the satellite orbits. The reference roll axis (also designated the X axis) is orthogonal to the yaw axis, passes through the spacecraft center of mass, and points in the direction of the spacecraft velocity. The reference pitch axis (also designated the Y axis) passes through the spacecraft center of mass, is orthogonal to each of the yaw and roll axes, and satisfies the right hand rule (i.e., Z axis crossed into the X axis yields the Y axis).

An error in yaw (also designated yaw angle PSI) is defined as an undesired angular translation of the spacecraft about the yaw axis. An error in roll (also designated roll angle PHI) is defined as an undesired angular translation of the spacecraft about the roll axis.

The spacecraft in the embodiment described herein is the stored momentum type, with components of momentum along pitch (primary bias) and yaw. The torsional stiffness about pitch provides decoupling between pitch and roll/yaw kinematics.

It is a difficult task to measure yaw errors in such a spacecraft, since an error in yaw cannot be detected by an earth horizon sensor as can an error in pitch or in roll. The normal methods of measuring yaw error are to use star sensors, such as star field mappers or star trackers; gyroscopes; or a digital sun sensor plus ephemeris data. Star sensors and gyroscopes are complex, heavy, and expensive. Gyroscopes have drift rates, and so have to be updated periodically by some other sensing means. The sun sensor method cannot be used at those positions within the orbit where sun blockage occurs.

The present invention overcomes the above drawbacks. It eliminates heavy devices in favor of an automatic, solely electronic, apparatus for detecting and correcting yaw errors at any point in the satellite's orbit; it minimizes the use of thruster gas for attitude corrections; and, for a given bias momentum, provides much better accuracy in peak yaw error than prior art techniques.

The invention makes use of the fact that a yaw error will eventually become a roll error due to the pitchstiffened kinematics of the spacecraft. It uses techniques of estimation theory to estimate yaw angle and roll and yaw disturbance torques from measured values of roll angle and yaw momentum. Two linear control loops are employed. A fast loop damps nutation and corrects roll errors by commanding wheel speed changes. A second, slower loop estimates and corrects yaw errors and also unloads yaw momentum by commanding changes in a yaw magnet coil drive. The second loop, of the Luenberger observer variety, is preferably implemented by digital computer. Certain constant scaling factors are programmed into the computer, e.g., by hard-wired read-only memories.

BRIEF DESCRIPTION OF THE DRAWINGS

These and other more detailed and specific objects of the present invention are more fully disclosed in the following specification, reference being had to the accompanying drawings, in which:

FIG. 2 is a vector diagram illustrating the operability of the stored momentum system of the satellite of the preferred embodiment of the present invention.

DESCRIPTION OF THE PREFERRED EMBODIMENTS

Figure 1:
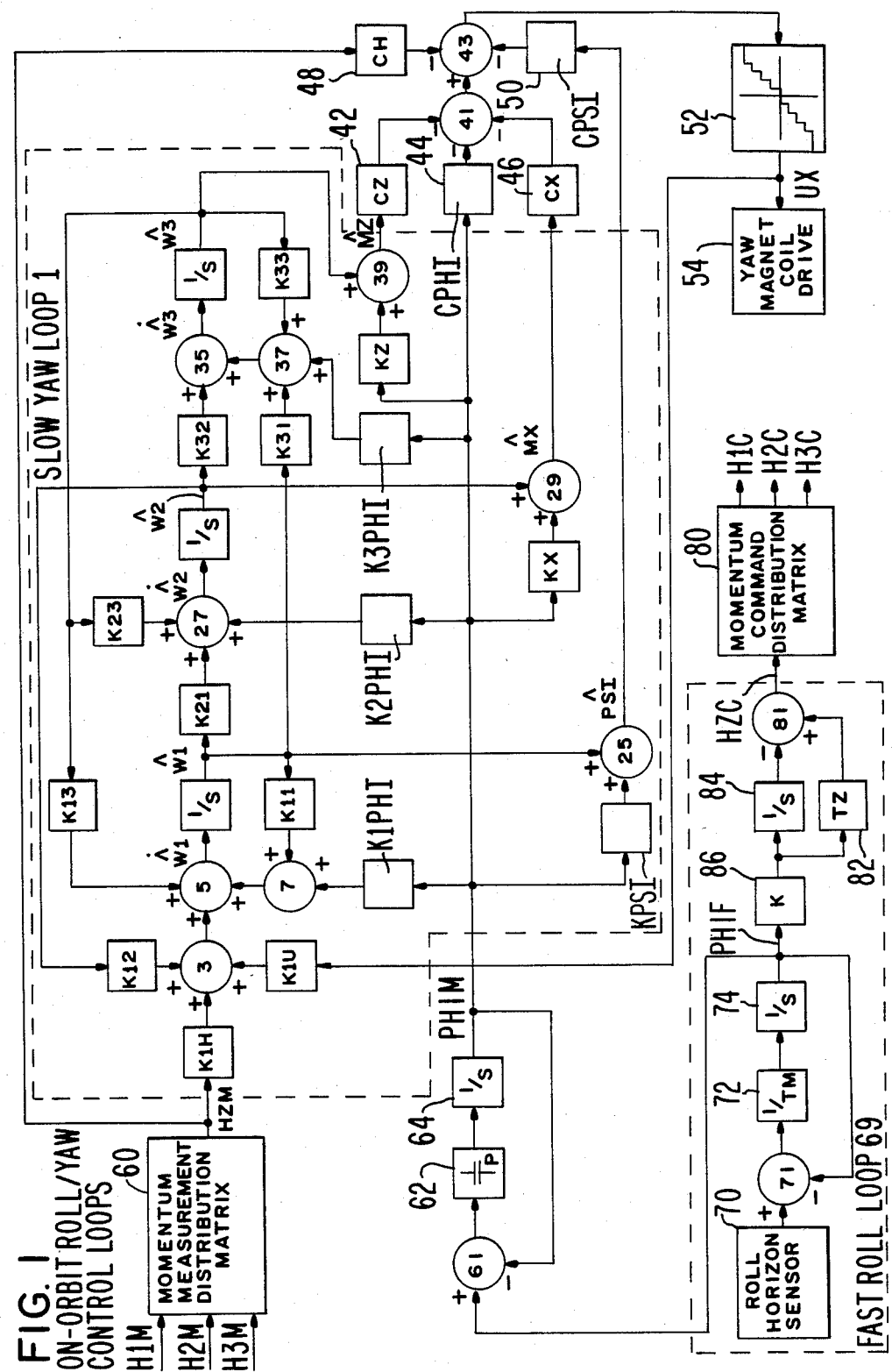
FIG. 1 is a block diagram of the control loops of the present invention.

One of the inputs of the slow control loop 1 of the present invention is measured momentum about the yaw axis. The spacecraft of the illustrated embodiment is one having a stored momentum system, with bias momentum along the pitch axis and the possibility of momentum along the yaw axis. For Example, FIG. 2 illustrates such a satellite wherein there are two primary momentum wheels, each lying in a plane orthogonal to the roll axis (the plane of the drawing). Each wheel has its major momentum component along the pitch axis, which provides torsional stiffening for the spacecraft about the pitch axis, and a momentum component along the yaw axis. In FIG. 2, a solid line with arrows on each end corresponding to each wheel represents a permissible range of operability of the momentum for the respective wheel. These momentum ranges are summed vectorially, and at the top portion of FIG. 2, the shaded region shows the resulting region of permissive momentum for the overall system.

Reasons for having two wheels rather than a single pitch wheel include provision of redundancy and a means to overcome the striction which might occur with the use of a single wheel. Using two canted wheels, one never has to pass through a zero wheel speed. Most of the stored momentum is oriented about the pitch axis, with the possibility of a small component of momentum along the yaw axis. A third wheel (not illustrated on FIG. 2) is a backup wheel which becomes operable (i.e., is sped up) only upon the breakdown of one of the two primary wheels. The third wheel is aligned along the yaw axis within the pitch/yaw plane so that it contributes a component of momentum along the yaw axis only.

Tachometers are affixed to each of the three momentum wheels for measuring the speed thereof. Simple mathematical formulas convert measured speed into measured momentum. The three values of measured momentum for the three wheels are designed H1M, H2M, and H3M, respectively (see FIG. 1). These values of momentum are fed into momentum measurement distribution matrix 60 which calculates the resultant measured (M) momentum (H) along the yaw (Z) axis, HZM, as described in the paper by Lebsock, supra.

Roll horizon sensor 70 is a typical earth horizon sensor, e.g., of the infrared variety, which produces a signal voltage corresponding to roll error PHI, which is fed to summer 71. The output signal from summer 71 is multiplied by a factor of 1/TM by multiplier 72 and integrated by integrator 74 and is then designated as PHIF (filtered PHI). PHIF is inverted and fed back to summer 71, thus completing a negative feedback loop filter with time constant TM. The letter S in integrator 74 and elsewhere is the Laplace operator. Multiplying by 1/S is equivalent to integrating, while multiplying by S is equivalent to differentiating. Components 71, 72, and 74 constitute a low pass filter to filter out unwanted noise.

PHIF is multiplied by compensation factor K by multipler 86. The resulting signal is integrated by integrator 84 and inverted before being fed to summer 81, and also multiplied by time constant factor TZ by multiplier 82, and fed as a second input to summer 81. The output of summer 81 is designated HZC (meaning a command signal for momentum along the Z axis) and fed to momentum command distribution matrix 80, which resolves its input signals into three components, H1C, H2C, and H3C, command signals for changing the speed of each of the three momentum wheels, respectively. Only two of these signals can be activated at any one time because only two of the wheels are in use at a given time, as described earlier. Together, elements 70, 71, 72, 74 86, 84, 82 and 81 constitute a fast loop 69 used to correct for roll errors and nutations. Items 81, 82, 84, and 86 provide a non-minimum phase correction as more fully explained in the paper by Terasaki, supra. For more information concerning the functioning of momentum command distribution matrix 80, see the paper by Lebsock, supra.

The signal PHIF is also fed as one input to summer 61, the output of which is fed to multiplier 62 which multiplies the signal by a factor of 1/TP, which is then integrated by integrator 64, the output of which is designated PHIM (measured PHI). PHIM is inverted and fed as a second input to summer 61, constituting a negative feedback loop. Together, elements 61, 62 and 64 constitute a low pass filter having time constant TP, which filters out unwanted noise. Because of the two noise filters operating upon PHI, slow loop 1 is more in the nature of a Luenberger observer than a Kalman filter.

It is thus seen that the two inputs to slow loop 1 are HZM and PHIM. Loop 1 passes these inputs through as outputs, and produces the additional outputs MZ (estimated disturbance torque along the Z body axis), MX (estimated disturbance torque along the X body axis), and PSI (estimated yaw angle). A ˆ above a variable indicates an estimate of that variable. A T indicates a time constant or a transpose function operating on a matrix. U indicates control. K indicates a commandable constant.

PHIM, HZM, MZ, MX, and PSI are then multiplied by pre-established scaling constants CPHI, CH, CZ, CX, and CPSI, respectively, by multipliers 44, 48, 42, 46, and 50, respectively, to construct contributions to the control torque UX from the various components of the system. The outputs from each of multipliers 42, 44, and 46 are inverted, summed by summer 41, and fed as a first input to summer 43. The outputs of multipliers 48 and 50 are each inverted and fed as second and third inputs to summer 43. The output of summer 43 is quantized and limited by function 52, which applies a limited step function to the signal, converting it into commanded control torque UX (meaning a control torque along the X body axis). The reason for limiting UX is that the output of summer 43 may exceed the capability of coil drive 54.

UX is fed back into loop 1 via multiplier K1U, and is also used to control yaw magnet coil drive 54, a magnetic torquer dipole oriented along the Z body axis, which is perpendicular to and interacts with the magnetic dipole of the earth or other body around which the satellite orbits. UX, rather than the output of summer 43, is fed back to loop 1 because loop 1 needs to know the actual torque applied on the spacecraft.

The X body torque applied by 54 in response to signal UX corrects for an error about the Z axis as desired. Activating torquer 54 also has the side effect of unloading (lowering) momentum along the Z body axis. This is desirable in such a stored momentum satellite because values of momentum increase over time as the attitude control system counteracts environmental disturbance torques, such as solar pressure, the earth's magnetic dipole, etc. Since the corrections to be made for yaw error are normally small in magnitude, the simple magnetic torquer is appropriate, rather than changing wheel speeds or firing a gas thruster.

The inner workings of loop 1 will now be examined.

The linearized roll/yaw dynamics of a spacecraft with stored momentum along pitch and yaw are given by the 6th order system of differential equations shown below using matrix notation.

$$\begin{bmatrix} (IX)S^2 + WO(HY) + 4(WO)^2(IY - IZ) & (HY - WO(IX - IY + IZ))S & -WO \\ -(HY - WO(IX - IY + IZ))S & (IZ)S^2 + WO(HY) + (WO)^2(IY - IZ) & S \\ K(1 - (TZ)S) & 0 & S((TM)S + 1) \end{bmatrix} \quad (1)$$

$$X \begin{bmatrix} PHI \\ PSI \\ HZ \end{bmatrix} = \begin{bmatrix} MX + UX \\ MZ + UZ \\ 0 \end{bmatrix}$$

where
- IX is the spacecraft moment of inertia about the roll (X) axis;
- IY is the spacecraft moment of inertia about the pitch (Y) axis;
- IZ is the spacecraft moment of inertia about the yaw (Z) axis;
- S is the Laplace operator;
- WO is the orbital angular velocity;
- HY is the spacecraft bias momentum (momentum along pitch axis);
- K is the Terasaki compensator of multiplier 86;
- TZ is the Terasaki compensator time constant of multiplier 82;
- TM is the roll measurement noise filter time constant of multiplier 72;
- PHI is the roll error (angle);
- PSI is the yaw error (angle);
- HZ is the spacecraft momentum along the Z axis;
- MX is the disturbance torque about the X body axis, i.e., that spacecraft axis which is desired to align with the X axis;
- UX is the control torque about the X body axis;
- MZ is the disturbance torque about the Z body axis, i.e., that spacecraft axis which is desired to align with the Z axis; and
- UZ is the control torque about the Z body axis.

This set of equations can be simplified by ignoring the gravity gradient and centripedal torques, which are small compared to the gyroscopic torques. In addition, the state vector for the system can be reduced from 6th order to 3rd order if the dynamics of interest are very slow compared to the wheel control coop and the nutation frequency, a reasonable assumption here. This is accomplished by ignoring the control loop time constants and the inertial torques. The equations then reduce to:

$$\begin{bmatrix} (WO)HY & (HY)S & -WO \\ -HY(S) & (WO)HY & S \\ K & 0 & S \end{bmatrix} \begin{bmatrix} PHI \\ PSI \\ HZ \end{bmatrix} = \begin{bmatrix} MX + UX \\ MZ + UZ \\ 0 \end{bmatrix} \quad (2)$$

This set can be rewritten with the state variables reordered:

$$\begin{bmatrix} S & WO & \frac{-WO}{HY} \\ -WO & S + \frac{K}{HY} & 0 \\ 0 & K & S \end{bmatrix} \begin{bmatrix} PSI \\ PHI \\ HZ \end{bmatrix} = \begin{bmatrix} \frac{1}{HY}(MX + UX) \\ \frac{-1}{HY}(MZ + UZ) \\ 0 \end{bmatrix} \quad (3)$$

A more useful form is the classic state variable expression:

$$\dot{\overline{X}} = \overline{F}\overline{X} + \overline{G}\overline{U} \quad (4)$$

where $\dot{\overline{X}}$, $\overline{X}$ and $\overline{U}$ are vectors, and F and G are matrices. F is the satellite kinematics matrix and G is the control distribution matrix. A dot above a variable indicates a time derivative. The state vector is defined as:

$$\overline{X} = [PSI\ PHI\ MX\ MZ]^T \quad (5)$$

HZM, the measured yaw axis momentum, will be considered as an input along with the filtered roll angle measurement, PHIM, and the control torque UX and UZ. The control vector is defined as:

$$\overline{U} = [UX\ UZ\ PHIM\ HZM]^T \quad (6)$$

The roll angle measurement will also be considered as a state variable in its kinematical relationship with yaw rate through orbit rate WO.

With the above definitions, the final form of the set of dynamic equations of motion is:

$$\begin{bmatrix} S(PSI) \\ S(PHI) \\ S(MX) \\ S(MZ) \end{bmatrix} = \begin{bmatrix} 0 & -WO & \frac{1}{HY} & 0 \\ WO & 0 & 0 & \frac{-1}{HY} \\ 0 & 0 & 0 & WO \\ 0 & 0 & -WO & 0 \end{bmatrix} \begin{bmatrix} PSI \\ PHI \\ MX \\ MZ \end{bmatrix} + \begin{bmatrix} \frac{1}{HY} & 0 & 0 & \frac{WO}{HY} \\ 0 & \frac{-1}{HY} & \frac{-K}{HY} & 0 \\ 0 & 0 & 0 & 0 \\ 0 & 0 & 0 & 0 \end{bmatrix} \begin{bmatrix} UX \\ UZ \\ PHIM \\ HZM \end{bmatrix} \quad (7)$$

where the short term relationship between yaw wheel momentum HZM and measured roll error has been dropped from the matrix relationship, and the orbit rate relationship between roll and yaw body axis components of a fixed inertial torque has been added.

Consider an inertial fixed torque M whose components in body axes are:

$$MX = M \sin(WOt)$$

$$MZ = M \cos(WOt) \quad (8)$$

where t is time.
Then $$d(MX)/dt = (WO)M \cos(WOT) = WO(MZ)$$

and $$d(MZ)/dt = -(WO)M \sin(WOt) = -WO(MX) \quad (9)$$

or $$S(MX) = WO(MZ)$$

$$S(MZ) = -WO(MX) \quad (10)$$

as shown above in equation (7).
The measurement vector $\bar{Z}$ is defined as $$\bar{Z} = H\bar{X} \quad (11)$$

$$\bar{Z} = [0\ 1\ 0\ 0] \times [PSI\ PHIM\ MX\ MZ]^T \quad (12)$$

i.e., only one state variable is measured.

A new reduced set of Luenberger observer state variables $\overline{W}$ defined as a linear sum of the original state variables not measured and a proportional part of the measured variable PHIM.

$$M^{-1} = \begin{bmatrix} 1 & 0 & 0 & -K1 \\ 0 & 0 & 0 & 1 \\ 0 & 1 & 0 & -K3 \\ 0 & 0 & 1 & -K5 \end{bmatrix}$$

$$\overline{W} = \begin{bmatrix} W1 \\ W2 \\ W3 \end{bmatrix} = \begin{bmatrix} 1 & 0 & 0 & 0 \\ 0 & 0 & 0 & 0 \\ 0 & 0 & 0 & 0 \end{bmatrix} \begin{bmatrix} PSI \\ PHIM \\ MX \\ MZ \end{bmatrix} - \begin{bmatrix} K1 \\ K3 \\ K5 \end{bmatrix} PHIM$$

or $$\begin{bmatrix} W1 \\ W2 \\ W3 \end{bmatrix} = \begin{bmatrix} 1 & K1 & 0 & 0 \\ 0 & K3 & 0 & 0 \\ 0 & K5 & 0 & 0 \end{bmatrix} \begin{bmatrix} PSI \\ PHIM \\ MX \\ MZ \end{bmatrix}$$

where W1, W2, and W3 are the observer state variables and K1, K3, and K5 are a set of gains (constants).

$$\overline{W} = \overline{K} \cdot \overline{X}$$

K is chosen such that the matrix $$M = \begin{bmatrix} K \\ H \end{bmatrix} = \begin{bmatrix} 1 & K1 & 0 & 0 \\ 0 & K3 & 0 & 0 \\ 0 & K5 & 0 & 0 \\ 0 & 1 & 0 & 0 \end{bmatrix}$$

is nonsingular.
Multiplying (7) by M and using $$X = M^{-1} \begin{bmatrix} \overline{W} \\ \overline{Z} \end{bmatrix}$$

yields $$\begin{bmatrix} \dot{\overline{W}} \\ \dot{\overline{Z}} \end{bmatrix} = M \cdot F \cdot M^{-1} \begin{bmatrix} \overline{W} \\ \overline{Z} \end{bmatrix} - M \cdot G \cdot \bar{U}$$

The matrices $M \cdot F \cdot M^{-1}$ and $M \cdot G$ are partitioned so that $$\begin{bmatrix} \dot{\overline{W}} \\ \dot{\overline{Z}} \end{bmatrix} = \begin{bmatrix} FWW & FWZ \\ FZW & FZZ \end{bmatrix} \begin{bmatrix} \overline{W} \\ \overline{Z} \end{bmatrix} - \begin{bmatrix} GW \\ GZ \end{bmatrix} \bar{U}$$

The reduced order Luenberger observer can then be synthesized from (19) as $$\dot{\hat{W}} = FWW\hat{W} + FWZ\overline{Z} + GW\bar{U};\ \hat{W}(0) = 0$$

The state estimates are given by $$\hat{X} = M^{-1} \begin{bmatrix} \hat{W} \\ \overline{Z} \end{bmatrix}$$

Starting with the matrix M evaluated in (16) we have

-continued $$M \cdot G = \begin{bmatrix} \frac{1}{HY} & \frac{-K1}{HY} & \frac{-K(K1)}{HY} & \frac{WO}{HY} \\ 0 & \frac{-K3}{HY} & \frac{-K(K3)}{HY} & 0 \\ 0 & \frac{-K5}{HY} & \frac{-K(K5)}{HY} & 0 \\ 0 & \frac{-1}{HY} & \frac{-K}{HY} & 0 \end{bmatrix} \quad (23)$$

$$MFM^{-1} = \begin{bmatrix} K1(WO) & \frac{1}{HY} & \frac{-K1}{HY} & \Bigg| & -WO - \frac{K3}{HY} - (K1)^2 WO + \frac{K1(K5)}{HY} \\ K3(WO) & 0 & \left(\frac{-K3}{HY} + WO\right) & \Bigg| & -K1(K3)(WO) + \frac{K3(K5)}{HY} - K5(WO) \\ K5(WO) & -WO & \frac{-K5}{HY} & \Bigg| & -K1(K5)(WO) + \frac{(K5)^2}{HY} + K3(WO) \\ WO & 0 & \frac{-1}{HY} & \Bigg| & \left(-K1(WO) + \frac{K5}{HY}\right) \end{bmatrix} \quad (24)$$

The observer is thus evaluated as $$\begin{bmatrix} \hat{\dot{W}}_1 \\ \hat{\dot{W}}_2 \\ \hat{\dot{W}}_3 \end{bmatrix} = \begin{bmatrix} K1(WO) & \frac{1}{HY} & \frac{-K1}{HY} \\ K3(WO) & 0 & \frac{-K3}{HY} + WO \\ K5(WO) & -WO & \frac{-K5}{HY} \end{bmatrix} \begin{bmatrix} \hat{W}_1 \\ \hat{W}_2 \\ \hat{W}_3 \end{bmatrix} + \quad (25)$$

$$\begin{bmatrix} -WO - \frac{K3}{HY} - (K1)^2 WO + \frac{K1(K5)}{HY} \\ -K1(K3)(WO) + \frac{K3(K5)}{HY} - K5(WO) \\ -K1(K5)(WO) + \frac{(K5)^2}{HY} + K3(WO) \end{bmatrix} PHIM +$$

$$\begin{bmatrix} \frac{1}{HY} & \frac{-K1}{HY} & \frac{-K(K1)}{HY} & \frac{WO}{HY} \\ 0 & \frac{-K3}{HY} & \frac{-K(K3)}{HY} & 0 \\ 0 & \frac{-K5}{HY} & \frac{-K(K5)}{HY} & 0 \end{bmatrix} \begin{bmatrix} UX \\ UZ \\ PHIM \\ HZM \end{bmatrix}$$

Equation (21) becomes, after evaluation and omission of PHI, $$\begin{bmatrix} \hat{PSI} \\ \hat{MX} \\ \hat{MZ} \end{bmatrix} = \begin{bmatrix} 1 & 0 & 0 \\ 0 & 1 & 0 \\ 0 & 0 & 1 \end{bmatrix} \begin{bmatrix} \hat{W}_1 \\ \hat{W}_2 \\ \hat{W}_3 \end{bmatrix} + \begin{bmatrix} -K1 \\ -K3 \\ -K5 \end{bmatrix} PHIM \quad (26)$$

The block diagram shown in FIG. 1 contains the implementation (with UZ terms deleted as explained below) of the reduced order observer with the following gain definitions employed in the multipliers of slow loop 1, and with $\hat{W}_1$ defined at the output of summer 5, $\hat{W}_2$ defined at the output of summer 27, and $\hat{W}_3$ defined at the output of summer 35.

$$K11 = K1(WO) \quad (27)$$

-continued $$K12 = \frac{1}{HY}$$

$$K13 = \frac{-K1}{HY}$$

$$KIPHI = -WO - \frac{K3}{HY} - (K1)^2 WO + \frac{K1(K5)}{HY} - \frac{K(K1)}{HY}$$

$$KIU = \frac{1}{HY}$$

$$K1H = \frac{WO}{HY}$$

$$K21 = K3(WO)$$

$$K23 = \frac{-K3}{HY} + WO$$

$$K2PHI = -K1(K3)(WO) + \frac{K3(K5)}{HY} - K5(WO) \frac{-K(K3)}{HY}$$

$$K31 = K5(WO)$$
$$K32 = -WO$$
$$K33 = \frac{-K5}{HY}$$

$$K3PHI = -K1(K5)(WO) + \frac{(K5)^2}{HY} - K3(WO) \frac{-K(K5)}{HY}$$

$$KPSI = -K1$$
$$KX = -K3$$
$$KZ = -K5$$

In FIG. 1, rectangular blocks indicate multiplication, circular items indicate summation, and arrows indicate current flow. A minus sign at the input of a summer indicates inversion of the signal prior to summation, while a plus sign indicates no inversion.

An expansion of equation (25) shows that $\hat{W}_n$ contains a $-K_nUZ/HY$ term, n=1, 2, 3. These terms have not been incorporated into FIG. 1 because the single control torque UX is sufficient for proper functioning of the system. If one wanted to perform a roll correction with slow loop 1 as well as a yaw correction, then one would insert these terms into the loop.

The eigenvalues or characteristic roots of the observer are given by the solution of the characteristic equation obtained by expanding $$\text{determinant}(SI - FWW) = 0 \tag{28}$$

where I is the 3×3 identity matrix. The characteristic equation is then $$S^3 + S^2\left(\frac{K5}{HY} - K1(WO)\right) + S\left((WO)^2 - \frac{2(K3)(WO)}{HY}\right) + (WO)^2\left(\frac{-K5}{HY} - K1(WO)\right) = 0 \tag{29}$$

As long as the real part of the roots are in the left half of the S-plane, the error in each of the estimated variables $\hat{PSI}$, $\hat{MX}$ and $\hat{MZ}$ will converge to a steady-state value of zero. The rate of convergence is determined by the natural frequency of the roots. Gains K1, K3, and K5 are selected to yield frequencies which are several times faster than the frequency of interest, i.e., orbit rate WO.

A generalized state-variable feedback controller is defined by $$UX = -[CPSI\ CPHI\ CH\ CMX\ CMZ]\begin{bmatrix} \hat{PSI} \\ \hat{PHIM} \\ \hat{HZM} \\ \hat{MX} \\ \hat{MZ} \end{bmatrix} \tag{30}$$

or $$UX = -C\bar{X}$$

The complete set of dynamic equations can then be written as $$\dot{\bar{X}} = F \cdot \bar{X} + G \cdot \bar{U} = (F - G \cdot C) \cdot \bar{X} \tag{31}$$

where $$F = \begin{bmatrix} 0 & -WO & \frac{WO}{HY} & \frac{1}{HY} & 0 \\ WO & \frac{-K}{HY} & 0 & 0 & \frac{-1}{HY} \\ 0 & -K & 0 & 0 & 0 \\ 0 & 0 & 0 & 0 & WO \\ 0 & 0 & 0 & 0 & 0 \end{bmatrix} \tag{32}$$

$$G = \begin{bmatrix} \frac{1}{HY} & 0 \\ 0 & \frac{-1}{HY} \\ 0 & 0 \\ 0 & 0 \\ 0 & 0 \end{bmatrix} \quad C = \begin{bmatrix} CPSI & CPHI & CH & CX & CZ \\ 0 & 0 & 0 & 0 & 0 \end{bmatrix} \tag{33}$$

and $\bar{X}$ has been augemented with the state HZM in order to include the Terasaki loop 69 in the overall system F matrix.

The eigenvalues of the controlled system are given by the observer eigenvalues of matrix FWW and the eigenvalues of the contoller, matrix (F−GC) in eqn. 29. Its characteristic equation can be shown to be $$S^2\left[(S^3 + \left(\frac{K}{HY} - \frac{CPSI}{HY}\right)S^2 - \frac{CPSI(K)}{HY^2} - WO\left(WO + \frac{CPHI}{HY}\right)S - \frac{CWO}{HY}(WO - CH)\right] = 0$$

This cubic is factorable into $$(S^2 + 2\text{delta}(WN)(S) + (WN)^2)\left(S - \frac{K}{HY}\right) = 0$$

where delta is the damping ratio associated with the roots and WN is the undamped natural frequency of oscillation of the roots. Gains are chosen to provide desired time response characteristics.

The slow loop 1 can be implemented in analog or digital form. It is rather difficult to implement in analog form because of the slow loop speed (typically on the order of 8 hours) which makes the drift commonly associated with analog components a problem. Therefore, it is most practicable to implement the block diagram by means of digital circuitry as in a digital integrated circuit microprocessor. All the constant multiplicative factors are predetermined and programmed into storage cells within the microprocessor for rapid on-orbit use.

During thruster firing, speed of the momentum wheels can vary widely, so it is desirable to inhibit functioning of slow loop 1 during this time. This can be accomplished by commanding the three 1/S integrators within loop 1 to hold their values during thruster firing.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In an orbiting satellite having a stored momentum system for stabilizing the attitude of the satellite about orthogonal roll, pitch, and yaw axes, apparatus for estimating and directly correcting yaw error, said apparatus comprising:

at least one momentum wheel having a component of momentum about the yaw axis;

means situated on board the satellite for measuring the angular error of the satellite body with respect to the roll axis, said means generating a signal corresponding to said roll error;

coupled to said roll error measuring means and to said momentum wheel, means comprising solely electronic components for estimating the angular error of the satellite body with respect to the yaw axis from the roll error signal and from a measured component of momentum about the yaw axis; and coupled to an output of said yaw error estimating means, means for continuously and directly correcting said yaw error during the satellite's orbit.

2. Apparatus of claim 1 wherein said roll error measuring means comprises an earth horizon sensor.

3. Apparatus of claim 1 wherein said yaw error estimating means comprises a reduced order Luenberger observer having as inputs the roll error signal and the measured momentum about the yaw axis, and having as outputs the estimated yaw error and estimated environmental disturbance torques about each of the roll and yaw axes; wherein the roll error signal, measured yaw momentum, and estimated yaw error and roll and yaw environmental disturbance torques are fed as inputs to the yaw error correcting means.

4. Apparatus of claim 1 wherein said yaw error correcting means comprises a magnetic dipole aligned perpendicular to the magnetic dipole of the body around which the satellite is orbiting.

5. Apparatus of claim 1 wherein the satellite orbits around the Earth, and said yaw error estimating means is operable throughout the satellite's orbit, including periods when the sun is not visible from the satellite.

6. Apparatus of claim 1 further comprising a fast Terasaki control loop for damping said roll error, said fast loop having:

a single input coupled to an output of said roll error measuring means; and an output coupled to said momentum wheel.

7. Apparatus of claim 1 wherein the momentum about said at least one momentum wheel stores pitch and yaw body axes of the satellite, thereby controlling the attitude of the satellite with respect to the orthogonal roll, pitch, and yaw axes.

8. Apparatus of claim 7 wherein the satellite has two momentum wheels, each situated in the pitch-yaw body plane of the satellite and canted away from the pitch body axis of the satellite, so that each wheel has a major component of momentum about the pitch body axis and a minor component of momentum about the yaw body axis, wherein the yaw component of momentum stored in the wheels is measured and fed as an input to the yaw error estimating means.

9. Apparatus of claim 8 further comprising:

coupled to each of said wheels, means for measuring the speed of each of said wheels;

coupled to said wheel measuring means, means for calculating the amount of angular momentum associated with each wheel and the component of total angular momentum about the yaw axis; and coupled to said calculating means and to said yaw error estimating means, means for conveying to said yaw error estimating means a signal representative of said component of total angular momentum about the yaw axis.

10. Apparatus of claim 1 further comprising two low pass filters coupled between the roll error measuring means and the yaw error estimating means.

11. Apparatus of claim 1 wherein the yaw error estimating means operates at a frequency approximately once every eight hours.

* * * * *